Nov. 24, 1959     N. KARPF     2,913,970
CAMERA WITH EXCHANGEABLE BACK
Filed Aug. 5, 1957
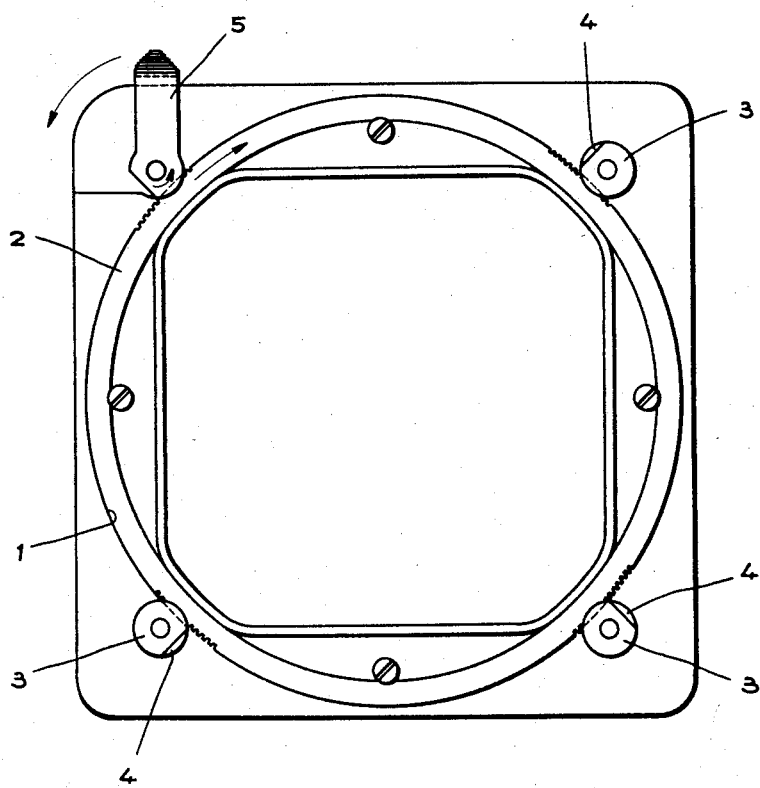
Inventor
Nikolaus Karpf
By Michael S. Striker
apt.

United States Patent Office 2,913,970
Patented Nov. 24, 1959

2,913,970

CAMERA WITH EXCHANGEABLE BACK

Nikolaus Karpf, Munich-Grosshesselohe, Germany, assignor to Valentin Linhof K.G., Munich, Germany Application August 5, 1957, Serial No. 713,775

8 Claims. (Cl. 95—11)

The present invention relates to photographic cameras of the type having an exchangeable back or darkslide carrier. In photographic cameras of the type indicated it has been known to provide for the camera and the darkslide carrier to be connected with one another by plug-in type or telescopic guide means of circular outline and to provide on the camera one or more sliding members adapted to engage in an annular groove provided in the said darkslide carrier. The said sliding members are disposed one at each of the four corners of the camera and adapted, when in their engaged position, to be covered by the darkslide carrier after the latter has been brought into registry with the camera. While these known attachment means afford an advantage in that they provide for a positive and airtight connection between the camera and the darkslide carrier, they render it difficult quickly to exchange the camera back, since it is necessary, when it is intended, for example, to substitute a roll-film back for the ground-glass screen, first to rotate the camera back in relation to the camera until the four sliding members or locks are exposed so that they can be pulled out one by one. It is only after these manipulations that the camera back can be removed for substitution by a different camera back. Finally, the four locks will have to be pushed back in again and the camera back to be rotated so that it registers with the camera body. These individual manipulations are, of course, time-consuming and thus make it impossible rapidly to exchange the various camera backs.

In view of the aforementioned drawbacks, the present invention provides a camera in which, while the camera and the exchangeable camera back are also adapted to be connected together by male and female guide members of circular shape provided on the camera and the camera back, respectively, the disadvantage of the time-consuming manipulations required to exchange the camera backs is eliminated by providing the guide member of the camera with and annular member having gear teeth formed therein, the said annular member being adapted to cooperate with the pivotally movable locking member serving to retain the camera back in position on the camera. Conveniently the said locking members are disposed one at each corner of the camera so that there are two pairs of locking members located diametrically opposite one another, the locking members having the form of discs having a flat surface extending at right angles to a radius, the said discs being adapted to engage in a groove provided in the camera back.

Other objects, features and advantages of the present invention will be readily apparent from the following detailed description of a preferred embodiment thereof taken in conjunction with the accompanying drawing showing an elevational view of said preferred embodiment.

Referring now more particularly to the drawing, there is generally indicated at 1 a cylindrical guideway of circular outline forming part of the camera body and adapted to receive a rotatable ring 2 which is provided with gear teeth on its outer periphery. The gear teeth of this ring member are in mesh with complementary gear teeth provided on each of the four disc members 3; it will be observed that each of these disc members projects inwardly over the boundary of the cylindrical guideway 1 and that each disc member has a flat surface 4 extending at right angles to a radius thereof. One of the said disc members 3 carries an extension 5 forming a lever whereby the toothed ring and the remaining three discs 3 can be operated simultaneously. With the lever 5 in the position indicated in the drawing, the camera back is locked in position on the camera, since the discs 3 are engaged, with their projecting peripheral portions, in a groove provided in the guide portion of the camera back. Preferably the said discs are spring-loaded so as to cause the camera back to be firmly and uniformly urged against the camera body.

Rotation of the lever 5 through 90° in the direction of the arrow will cause the toothed ring to be rotated and, in turn, to rotate the discs 3 in such a manner as to bring the flat surfaces 4 thereof into a position in which they extend tangentially of the calendrical guideway 1, the result being that the camera back is unlocked and can be removed immediately.

It will be understood that the rotatable ring 2 will have to be provided with gear teeth on those portions of its circumference only which cooperate with the teeth formed in the discs 3 and the disc portion of lever 5.

It will be seen that the device of the invention eliminates all time-consuming manipulations formerly required to exchange camera backs. It is only necessary to swing the operating lever through 90° to permit the camera back to be immediately replaced with a different one; after insertion of the new camera back, the lever is then returned into its original position. The advantage of this rapid procedure of exchanging camera backs is of particular importance in cases in which roll-film holders loaded with different types of negative material are being used and where it is intended quickly to select the most suitable film.

It will be understood that modifications and variations may be effected without departing from the spirit and scope of the novel concepts of the present invention.

I claim:

1. A photographic camera, comprising an exchangeable camera back, the camera and the camera back being provided with guideways of circular outline capable of being telescopically engaged with one another, characterized in that the guideway of the camera is provided with a single rotatable ring having formed therein gear teeth adapted to cooperate with complementary gear teeth provided on a plurality of locking members adapted to hold the camera back in position on the camera.

2. A camera as claimed in claim 1, characterized in that the said locking members have the shape of discs provided each with a flat surface extending at right angles to a radius thereof.

3. A camera as claimed in claim 2, characterized in that the said discs are adapted to engage in a groove provided in the guideway portion of the camera back.

4. A camera as claimed in claim 2, characterized in that four of said discs are provided, one of which is disposed at each of the four corners of the camera.

5. A camera as claimed in claim 2, characterized in that at least one of the said discs is formed as a lever adapted to operate the said rotatable ring carrying gear teeth.

6. A camera as claimed in claim 2, characterized in that the said discs are spring-loaded.

7. A photographic camera having a rear face formed with a circular groove and comprising, in combination, an exchangeable camera back having a circular rim portion adapted to be inserted in said groove; a plurality of spring loaded disc-shaped locking members mounted spaced from each other for turning movement about axes respectively located adjacent said groove between a locking position in which a portion of each locking member engages said camera back to urge said camera back in a position in which it is securely and light-tightly connected with said camera and an unlocking position in which said portions of said locking members are disengaged from said camera back so that the latter may be removed from said camera; and a single ring located in said groove and connecting said locking members for simultaneous turning movement, said ring and said locking members being formed with gear teeth meshing with each other so that upon turning of one of said locking members, all of said locking members are turned through the same angle, whereby a single gear arrangement serves to bring said locking members into a predetermined locking position as well as to firmly and uniformly urge said camera back into a positive light-tight connection with said camera.

8. A camera as defined in claim 7, wherein one of said locking members is formed with a lever extending laterally therefrom to facilitate turning of said locking member to cause turning of said ring and simultaneous turning of the other locking members.

References Cited in the file of this patent

FOREIGN PATENTS

| | | |
|---|---|---|
| 175,170 | Germany | 1905 |
| 1,910 | Great Britain | 1914 |